(12) United States Patent
Yeh

(10) Patent No.: US 6,474,813 B1
(45) Date of Patent: Nov. 5, 2002

(54) EYEGLASSES HAVING ANGLE ADJUSTABLE TEMPLES

(75) Inventor: Hsien-Jung Yeh, Tainan (TW)

(73) Assignee: Day Sun Industrial Corp., Tainan (TW)

( * ) Notice: Subject to any disclaimer, the term of this patent is extended or adjusted under 35 U.S.C. 154(b) by 0 days.

(21) Appl. No.: 10/124,025

(22) Filed: Apr. 17, 2002

(51) Int. Cl.$^7$ .................................................. G02C 5/14
(52) U.S. Cl. ........................................ 351/120; 351/111
(58) Field of Search ................................ 351/120, 119, 351/118, 111, 41, 153; 16/228

(56) References Cited

U.S. PATENT DOCUMENTS 6,364,479 B1 * 4/2002 Wu ............................. 351/120

* cited by examiner

Primary Examiner—Hung Xuan Dang
(74) Attorney, Agent, or Firm—Alan D. Kamrath; Rider, Bennett, Egan & Arundel

(57) ABSTRACT

An angle adjustment mechanism for eyeglasses comprises a connection device including a rear engagement member, an outer cross aperture, an inner cavity, a front bar, an outer recessed portion, and a ridged section; a temple including a connection section, a front cut-out member, a hole through cut-out member, a transverse rhombic aperture abutted on inner end of hole, a recess on a shoulder between cut-out member and connection section, and a peg projected from a front end of cut-out member; and a dumbbell shaped snapping device passed through the apertures wherein engagement member is engaged with cut-out member with bar received in recess to communicate cross aperture with rhombic aperture, snapping device is inserted into hole to pass its end abutment member through the apertures to be flush with cavity, abutment member is rotated to urge against cross aperture, and peg is slidably engaged with ridged section.

1 Claim, 5 Drawing Sheets

EYEGLASSES HAVING ANGLE ADJUSTABLE TEMPLES

FIELD OF THE INVENTION

The present invention relates to eyeglass frame and more particularly to eyeglasses having improved angle adjustable temples.

BACKGROUND OF THE INVENTION

Eyeglasses having angle adjustable temples is well known. However, prior angle adjustment mechanisms have suffered certain deficiencies such as limited flexibility, structural complexity, and unreliable. Thus improvement exists in order to overcome the above drawbacks of prior art.

SUMMARY OF THE INVENTION

It is therefore an object of the present invention to provide an angle adjustment mechanism for an eyeglasses comprising a connection device pivotably coupled to a frame of the eyeglasses and including an engagement member at a rear end, a cross-shaped aperture open to an outer side, a cavity open to an inner side and abutted on the cross-shaped aperture, an elongated protrusion extended horizontally from the engagement member, a recessed portion on the outer side, and a ridged section in the recessed portion; a temple including a connection section, a cut-out member in a front inner portion of the connection section, a hole through the cut-out member, a transverse rhombic aperture abutted on an inner end of the hole, a recess on a shoulder between the cut-out member and the connection section, and a peg projected horizontally from a front end of the cut-out member; and a snapping device including an outer disk-shaped head, a shank adapted to an engagement of the transverse rhombic aperture and the cross-shaped aperture, and an abutment member at one end passed through the transverse rhombic aperture and the cross-shaped aperture. In an assembly process, the engagement member is engaged with the cut-out member with the elongated protrusion received in the recess to cause the cross-shaped aperture to be open to the transverse rhombic aperture, the snapping device is inserted into the hole from the outer side of the connection section to pass the abutment member through the transverse rhombic aperture and the cross-shaped aperture to be flush with the cavity, the abutment member is rotated about 90 degrees to urge the abutment member against the cross-shaped aperture, and the peg is slidably engaged with the ridged section. In adjusting an angle of temple relative to the frame, rotate the temple clockwise or counterclockwise a predetermined angle to slide the peg along the ridged section until the peg is positioned between a valley between two ridges of the ridged section.

The above and other objects, features and advantages of the present invention will become apparent from the following detailed description taken with the accompanying drawings.

DETAILED DESCRIPTION OF THE PREFERRED EMBODIMENTS

Figure 1:
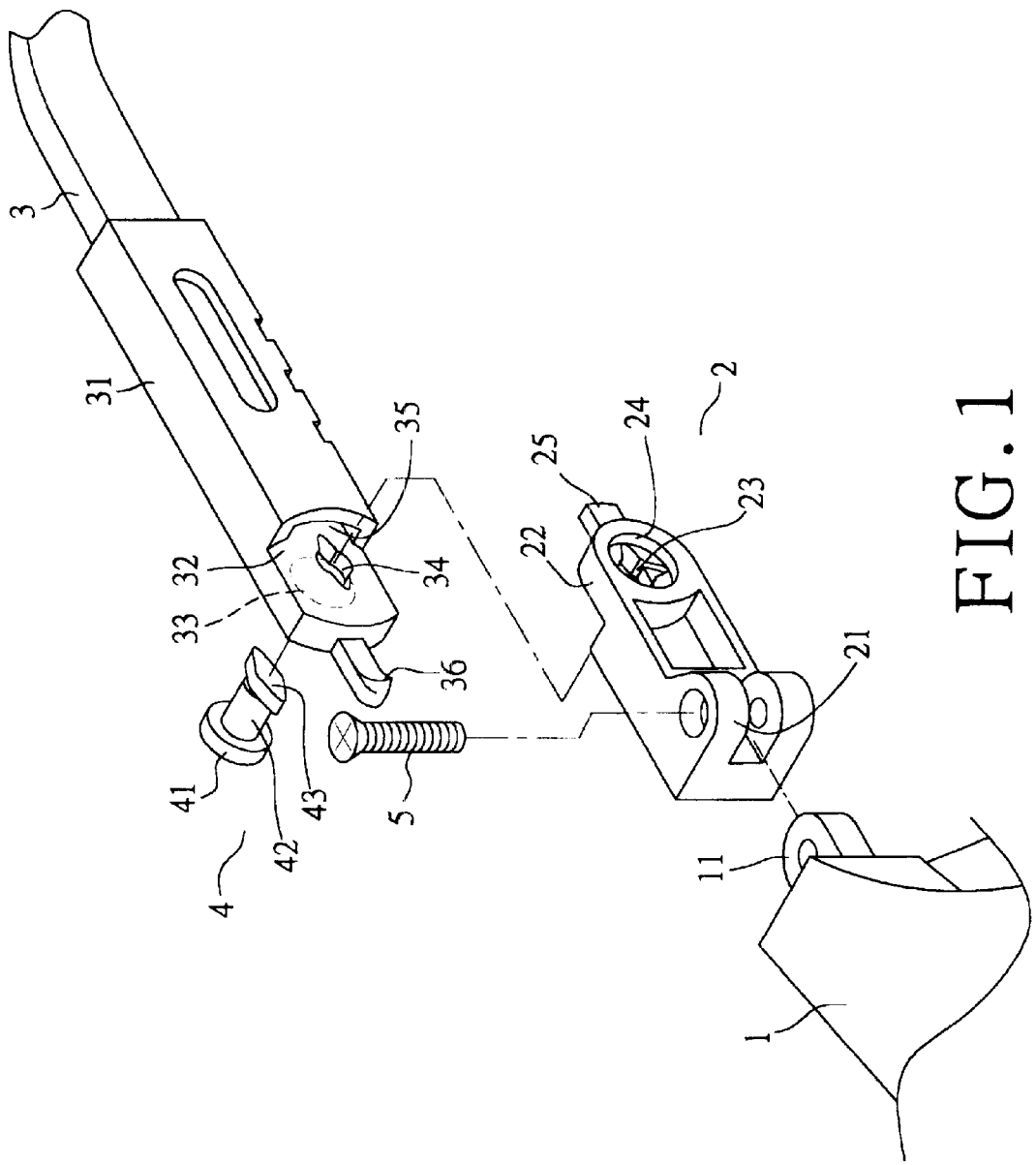
FIG. 1 is an exploded view of a mechanism for adjusting angle of temple of eyeglasses according to the invention.
Figure 2:
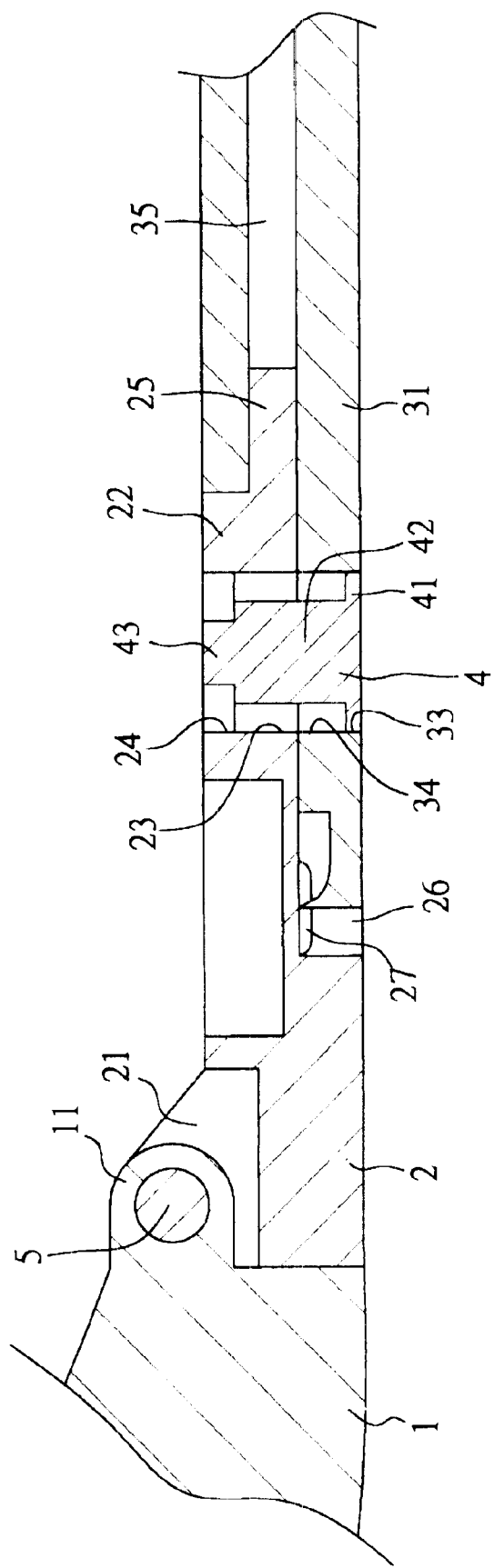
FIG. 2 is a cross-sectional view of the assembled mechanism.
Figure 3:
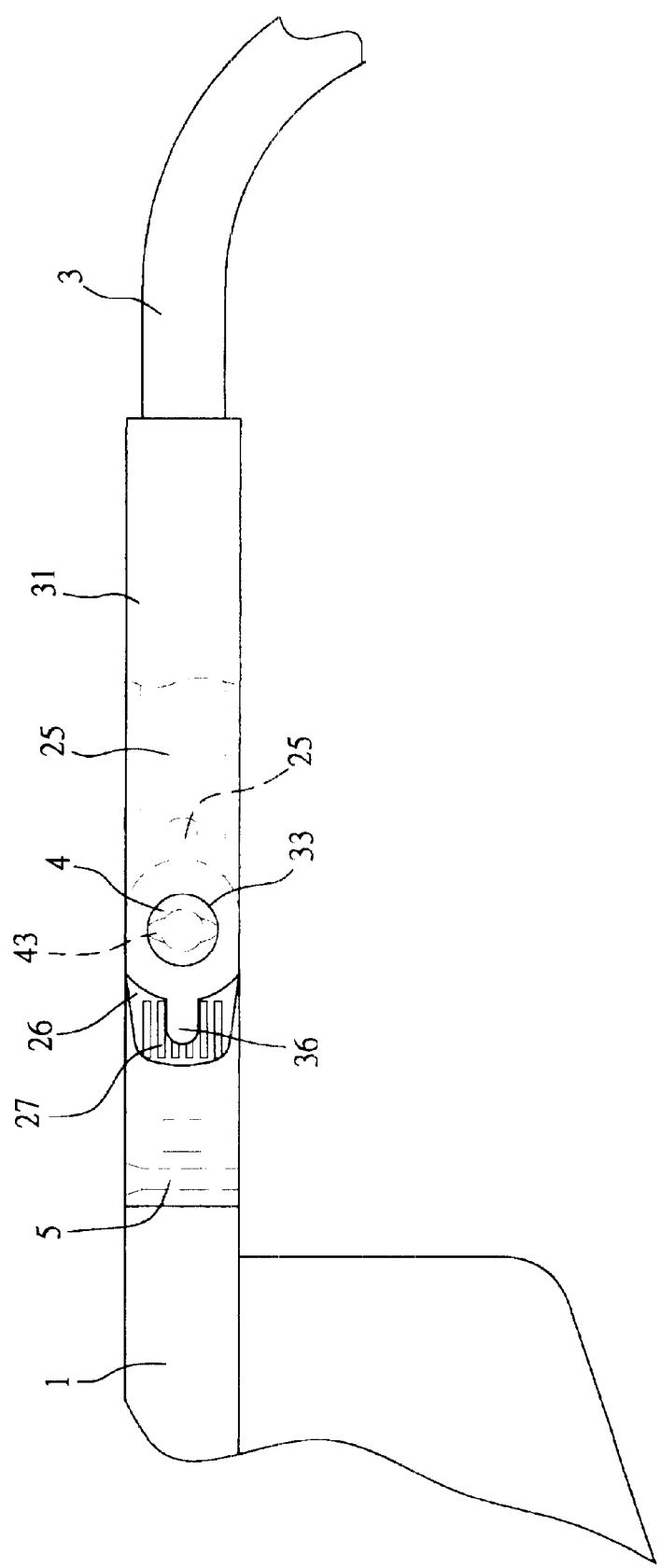
FIG. 3 a side view of the FIG. 2.

Referring to FIGS. 1, 2 and 3, there is shown a mechanism for adjusting angle of temple of eyeglasses in accordance with the invention. The mechanism comprises a frame 1, a connection device 2, a temple 3, and a snapping device 4. The frame 1 has a holed lug 11 at either end and the connection device 2 comprises a holed recessed end 21 so that frame 1 and connection device 2 can be pivotably coupled together by driving a screw 5 through the holed recessed end 21 and the holed lug 11 which is sandwiched between upper and lower lug portions of the holed recessed end 21. Such connection is well known. Thus a detailed description thereof is omitted herein.

Connection device 2 further comprises an engagement member 22 at the other end, a cross-shaped aperture 23 open. to outer side, a cavity 24 open to inner side and abutted on the cross-shaped aperture 23, an elongated protrusion 25 extended horizontally from engagement member 22, a recessed portion 26 formed on outer side, and a ridged section 27 in recessed portion 26. Temple 3 comprises a connection section 31, a cut-out member 32 on the inner side in the front end of connection section 31, a hole 33 through the cut-out member 32, a transverse rhombic aperture 34 abutted on the inner end of hole 33, a recess 35 on a shoulder between cut-out member 32 and connection section 31, and a peg 36 projected horizontally from the front end of cut-out member 32. Snapping device 4 is shaped like a dumbbell and comprises an outer disk-shaped head 41 having a thickness substantially conformed to a depth of hole 33, a shank 42 having a length and a diameter adapted to the engagement of transverse rhombic aperture 34 and cross-shaped aperture 23, and an abutment member 43 at one end passed through transverse rhombic aperture 34 and cross-shaped aperture 23 having a thickness substantially conformed to depth of cavity 24.

Referring to FIGS. 2 and 3 specifically, an assembly of the mechanism will now be described as follows: First, as stated above, drive screw 5 through the holed recessed end 21 and the holed lug 11 for pivotably coupling frame 1 and connection device 2 together wherein the holed lug 11 is sandwiched between upper and lower lug portions of the holed recessed end 21. Next, engage engagement member 22 of connection device 2 with the cut-out member 32 of temple 3 with elongated protrusion 25 received in recess 35. Thus, cross-shaped aperture 23 is open to transverse rhombic aperture 34. Insert snapping device 4 into hole 33 from outer side of connection section 31 until abutment member 43 passes through transverse rhombic aperture 34 and cross-shaped aperture 23 to be flush with the open end of cavity 24. Then rotate abutment member 43 about 90 degrees to urge abutment member 43 against cross-shaped aperture 23. Finally, engage peg 36 with ridged section 27.

Figure 4:
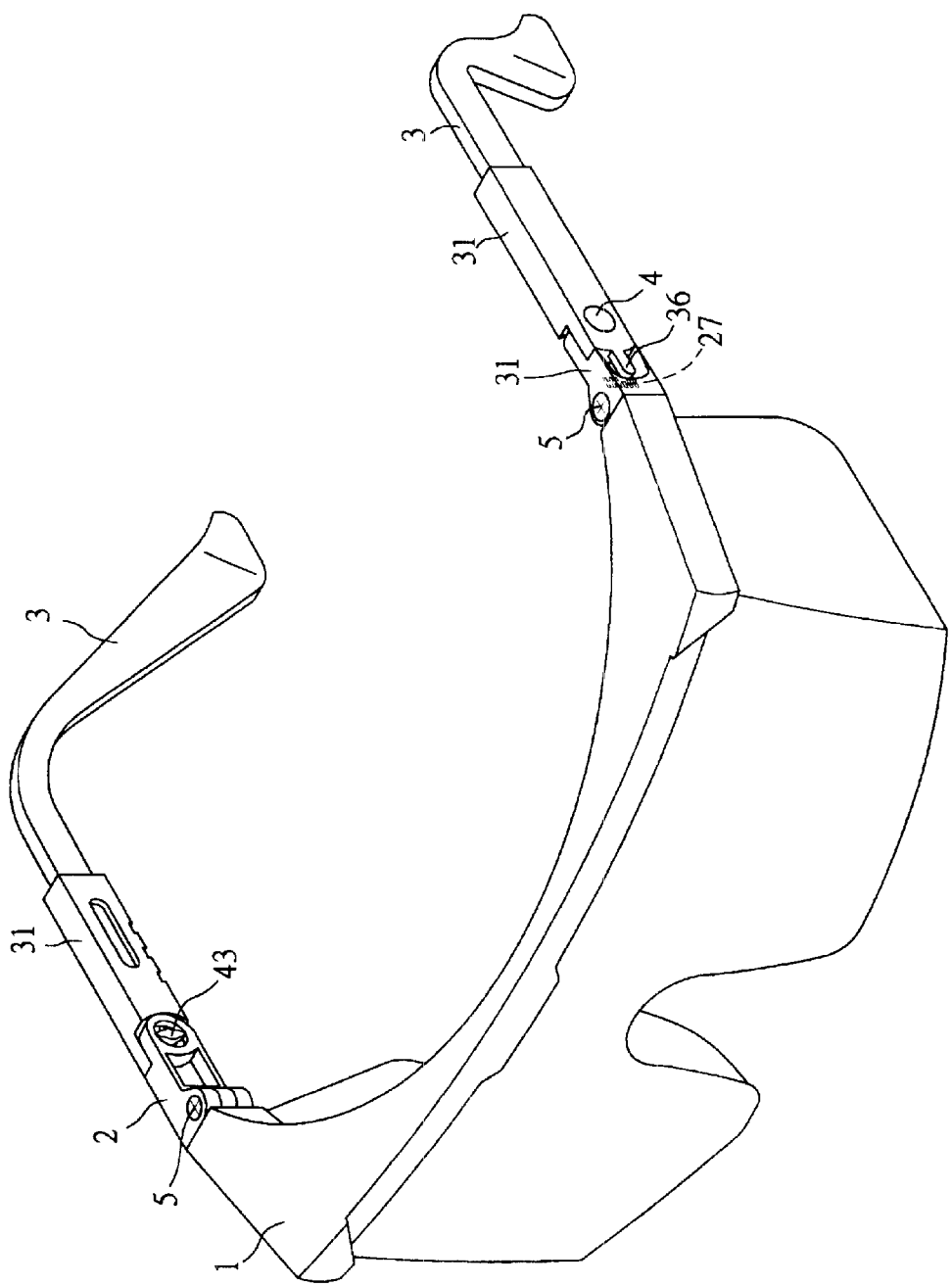
FIG. 4 is a perspective view of an eyeglasses incorporated the mechanisms.
Figure 5:
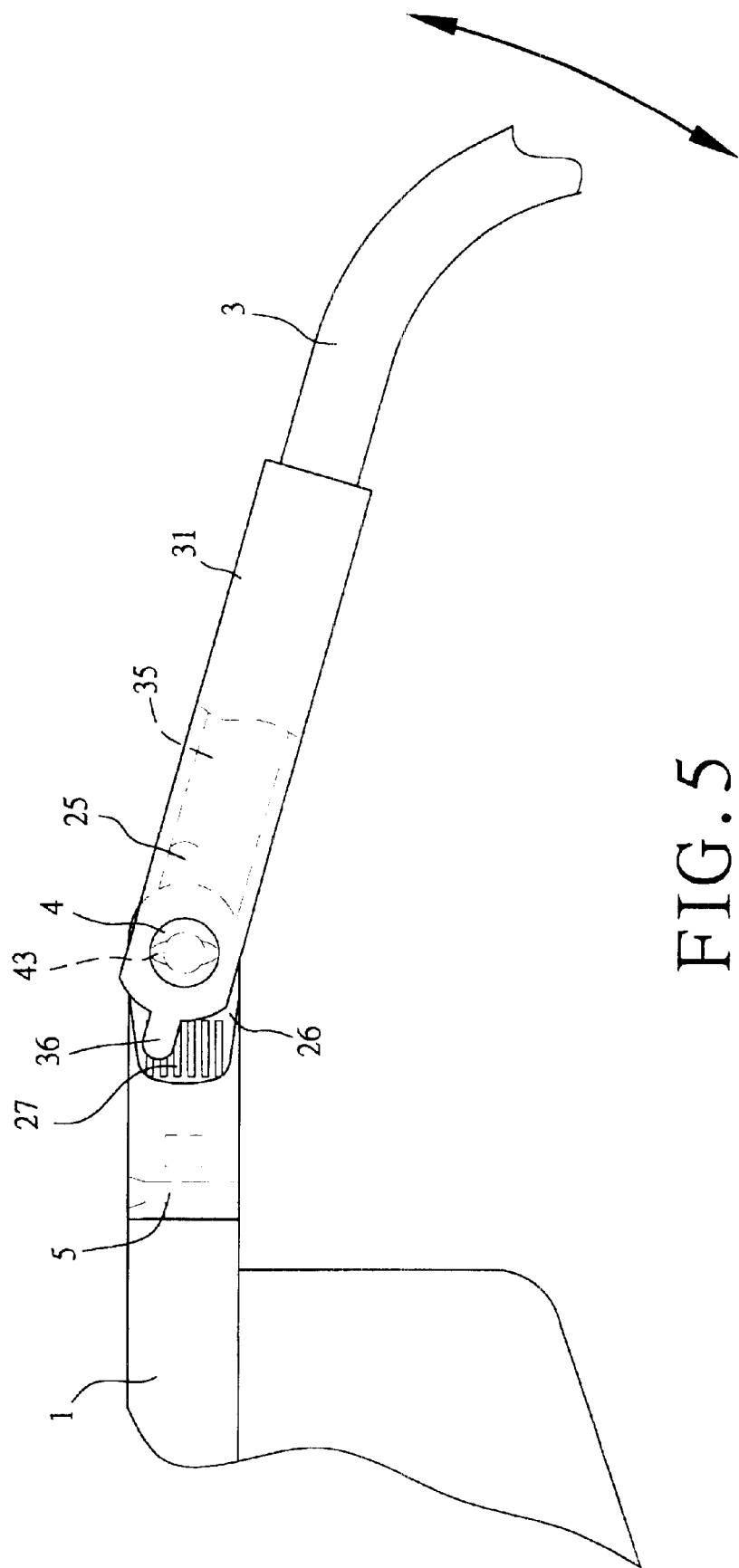
FIG. 5 is a side view illustrating an angle adjustment of temple.

Referring to FIG. 4, there is shown assembled eyeglasses. Referring to FIG. 5, an angle adjustment of temple is illustrated. In detail, user may slightly rotate temple 3 clockwise or counterclockwise a desired angle to cause peg 36 to slide along ridged section 27 until peg 36 is positioned between a valley between two ridges of ridged section 27. Such adjustment is smooth. Most importantly, the positioning of peg 36 on ridged section 27 is secure.

While the invention has been described by means of specific embodiments, numerous modifications and variations could be made thereto by those skilled in the art without departing from the scope and spirit of the invention set forth in the claims.

What is claimed is:

1. An angle adjustment mechanism for an eyeglasses comprising:

a connection device pivotably coupled to a frame of the eyeglasses and including an engagement member at a rear end, a cross-shaped aperture open to an outer side, a cavity open to an inner side and abutted on the cross-shaped aperture, an elongated protrusion extended horizontally from the engagement member, a recessed portion on the outer side, and a ridged section in the recessed portion;

a temple including a connection section, a cut-out member in a front inner portion of the connection section, a hole through the cut-out member, a transverse rhombic aperture abutted on an inner end of the hole, a recess on a shoulder between the cut-out member and the connection section, and a peg projected horizontally from a front end of the cut-out member; and a snapping device including an outer disk-shaped head, a shank adapted to an engagement of the transverse rhombic aperture and the cross-shaped aperture, and an abutment member at one end passed through the transverse rhombic aperture and the cross-shaped aperture;

wherein the engagement member is engaged with the cut-out member with the elongated protrusion received in the recess to cause the cross-shaped aperture to be open to the transverse rhombic aperture, the snapping device is inserted into the hole from the outer side of the connection section to pass the abutment member through the transverse rhombic aperture and the cross-shaped aperture to be flush with the cavity, the abutment member is rotated about 90 degrees to urge the abutment member against the cross-shaped aperture, and the peg is slidably engaged with the ridged section so that it is operable to rotate the temple clockwise or counterclockwise a predetermined angle to slide the peg along the ridged section until the peg is positioned between a valley between two ridges of the ridged section.

* * * * *